July 22, 1969 K. MACHER 3,457,003
FOUR-COMPONENT VARIFOCAL ATTACHMENT FOR BASIC OBJECTIVE
Filed June 29, 1966 3 Sheets-Sheet 3

(a)

(b)

INVENTOR:
Karl Macher
BY:
Karl J. Ross
Attorney

United States Patent Office 3,457,003
Patented July 22, 1969

3,457,003
FOUR-COMPONENT VARIFOCAL ATTACHMENT FOR BASIC OBJECTIVE
Karl Macher, Bad Kreuznach, Rhineland, Germany, assignor to Firma Jos. Schneider & Co., Bad Kreuznach, Rhineland, Germany, a corporation of Germany
Filed June 29, 1966, Ser. No. 561,614
Claims priority, application Germany, July 1, 1965, Sch 37,311
Int. Cl. G02b *15/00, 17/00, 9/34*
U.S. Cl. 350—184          4 Claims

ABSTRACT OF THE DISCLOSURE

Varifocal attachment for four-lens basic objective, with two fixed positive components bracketing two movable negative components, the first positive component and the first negative component being a pair of doublets with nearly plane confronting surfaces; the second negative component is a meniscus-shaped singlet while the second positive component is a biconvex singlet. Relative apertures of 1:1.8 and varifocal ratios of approximately 4:1 are achieved.

My present invention relates to a varifocal objective of the type wherein, e.g. as broadly disclosed in commonly owned U.S. Patent No. 3,057,257, issued jointly to Günter Klemt and me, and adjustable front group or varifocal attachment, consisting of two fixed positive components bracketing two axially movable negative components, precedes an axially fixed rear group or basic objective, preferably also constituted by four air-spaced lens members. As applied particularly to the first component of the front group, the term "fixed" does not exclude a limited adjustability for focusing purposes, as is well understood in the art.

In a commonly owned copending application filed by me jointly with Rudolf Solisch and Walter Wöltche, Ser. No. 366,878, dated May 12, 1964, now Patent No. 3,273,457, there has been disclosed an objective of this type wherein the positive first component and the negative second component of the front group are each in the form of a doublet with a forwardly concave cemented surface of, respectively, negative and positive refractivity; the other two components of this group are singlets. This system is particularly suitable for use in reflex-type cameras, a reflex prism being accommodable (together with a diaphragm, if desired) in the space separating the two groups. The particular system disclosed in that copending application has a relative aperture of 1:1.8, a varifocal ratio (ratio of overall focal lengths $f_{min}$ and $f_{max}$ in the two limiting positions of adjustment) of 1:4 and a mean focal length $f_0$ (in an intermediate position of adjustment) approximately equal to the group focal length of the basic objective; if the mean overall focal length is assigned a value of 100 linear units (e.g., millimeters), the system has a back-focal length of numerical value 58.1 and a total axial length of 522.93 units.

The general object of my present invention is to provide a more compact objective system of this type, having substantially the same varifocal ratio and relative aperture, which has a reduced axial length $d_{total}$ and, with a back-focal length $s'$ equal to or greater than that of the prior system referred to, an increased ratio $s'/d_{total}$ which is of value in motion-picture and small photographic cameras since it simplifies the installation of shutters and other auxiliary elements behind the rear vertex. The invention also aims at realizing this improvement with small lens diameters and maximum suppression of residual astigmatism field curvature and coma.

The two doublets forming part of the front group of a system according to the present invention have confronting surfaces which, as in the system of the copending application, are almost planar, i.e., their radii of curvature $r$ are greater than $10f_0$ and their individual powers $\Delta n/r$ are less than $0.1f_0$. In contradistinction to the prior system, in which also the rear surface of the movable, negative third component of this group is nearly plane, the system according to the present improvement has as its third component a lens of definite meniscus shape whose rear surface has a positive refractive power greater than that of the cemented surface of the immediately preceding doublet but less that of either surface of the fourth, fixed component which is designed as a biconvex lens. Thus, the radius of curvature of this surface should be substantially shorter than that of the two confronting doublet surfaces but longer than any other radius of curvature of the varifocal front group.

I have found that a system of this description allows the variable first and third air spaces of the front group, i.e., those between the first and second and between the third and fourth components, to assume minimum values considerably smaller than in the prior system in the limiting positions of minimum and maximum overall focal length, respectively; moreover, the stroke length of the movable third component is appreciably reduced. Both these factors contribute to the greater compactness of my present system.

The invention will be described in greater detail with reference to the accompanying drawing in which.

Figure 1:
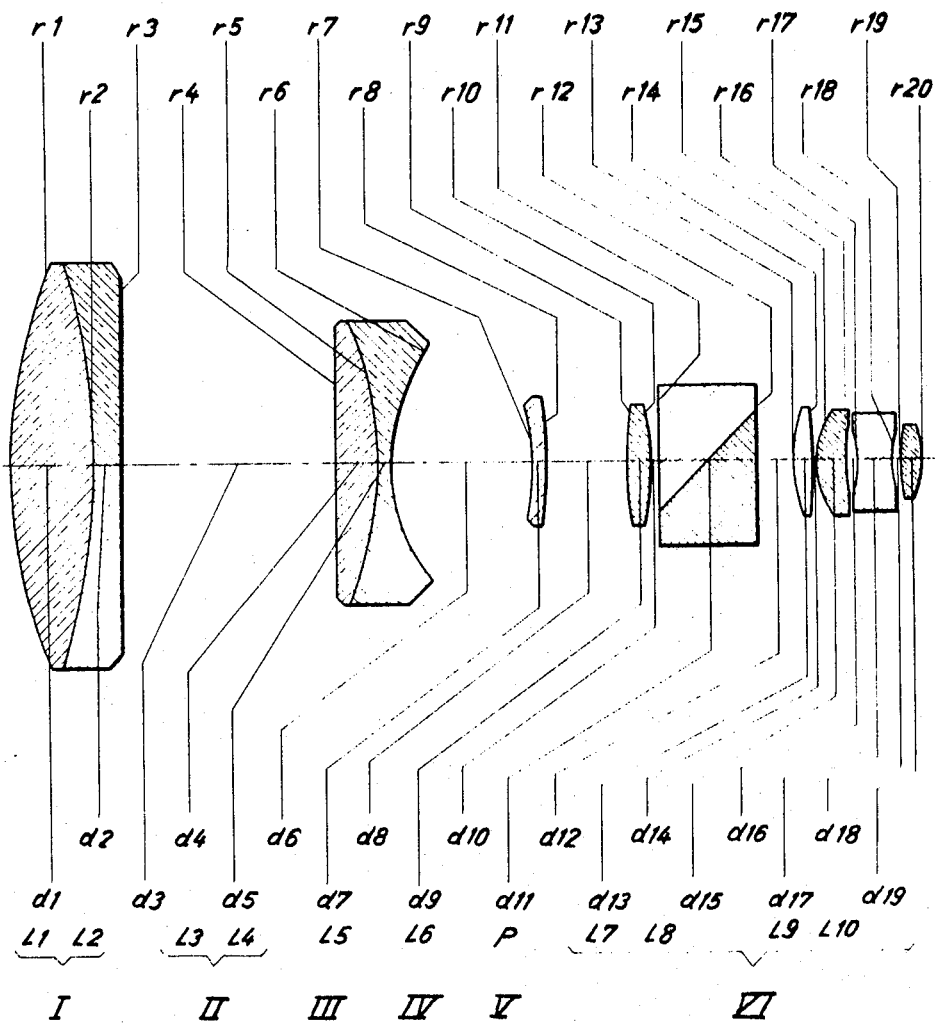
FIG. 1 illustrates an optical objective system embodying the invention.
Figure 2:
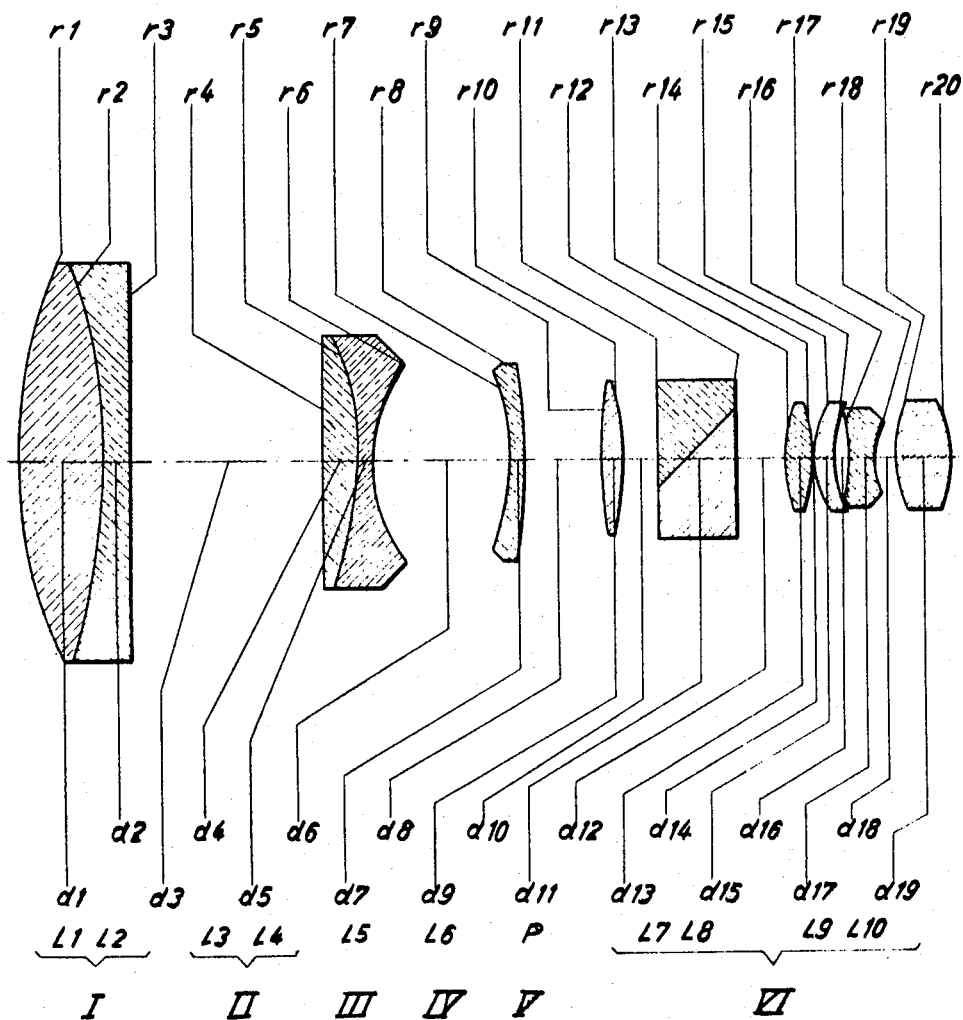
FIG. 2 is a view similar to FIG. 1, showing a modification of the system.

The objectives shown in FIGS. 1 and 2 differ from each other only in the magnitude of certain parameters and are otherwise structurally identical. For this reason, the same reference characters have been used in both instances.

In each of these objectives, a varifocal attachment or front group is constituted by four air-spaced components I–IV, preceding a basic objective or fixed rear group VI; between these two groups, an afocal component V in the form of a reflex prism P is inserted; as in the system of the copending application, a diaphragm (not shown) may be positioned next to this prism.

Component I is a doublet composed of a positive lens $L_1$ with radii $r_1$, $r_2$ and thickness $d_1$, which is cemented onto a negative lens $L_2$ having radii $r_2$, $r_3$ and thickness $d_2$, components II, separated from component I by a variable air space $d_3$, is likewise a doublet consisting of a positive lens $L_3$ (with radii $r_4$, $r_5$ and thickness $d_4$) and a negative lens $L_4$ (with radii $r_5$, $r_6$ and thickness $d_5$) cemented to it. Another variable air space $d_6$ intervenes between this movable member and the next likewise movable component III which is a single lens $L_5$ with radii $r_7$, $r_8$ and thickness $d_7$. The last component IV of the attachment, which follows component III by a further variable air space $d_8$, is a positive singlet $L_6$ with radii $r_9$, $r_{10}$ and thickness $d_9$. The large air space between the attachment I–IV and the principal objective VI is partly occupied by the prism P (component V) of axial width $d_{11}$, which is bounded by flat surfaces designated $r_{11}$ and $r_{12}$, separated from lens $L_6$ by a small air space $d_{10}$ and from the fixed lens group VI by a larger air space $d_{12}$ adapted to accommodate the diaphragm. The basic objective VI consists of four air-spaced singlets including a positive lens $L_7$ with radii $r_{13}$, $r_{14}$ and thickness $d_{13}$, another positive lens $L_8$ (radii $r_{15}$, $r_{16}$ and thickness $d_{15}$) separated from the lens $L_7$ by an air space $d_{14}$, a negative third lens $L_9$ with radii $r_{17}$, $r_{18}$ and a relatively great axial thickness $d_{17}$, this lens being separated from lens $L_8$ by the air space $d_{16}$, and finally a positive fourth lens $L_{10}$ (radii $r_{19}$, $r_{20}$ and thickness $d_{19}$) whose separation $d_{18}$ from the preceding lens $L_9$ is less than half the thickness $d_{17}$ of the latter.

The following Table I lists representative values for the radii $r_1$ to $r_{20}$ and the thicknesses and separations $d_1$ to $d_{19}$ of lenses $L_1$ to $L_{10}$ (based upon a numerical value of 100 for the mean focal length of the system), the refractive indices $n_d$ of these lenses, their Abbé numbers $\nu$ and their surface powers $\Delta n/r$, the system so defined having an aperture ratio of 1:1.8, a back-focal length of 58.1 and a varifocal range from 55 to 210 units (e.g., millimeters).

The individual focal lengths of the components I, II, III, IV and VI of the foregoing system have the following numerical values:

$f_I = +516.80$
$f_{II} = -196.18$
$f_{III} = -321.77$
$f_{IV} = +249.08$
$f_{VI} = +101.39$

For the minimum, median and maxium values of the overall focal length $f$, the variable air spaces $d_3$, $d_6$ and $d_8$ have the following widths:

| | $f$ | $d_3$ | $d_6$ | $d_8$ |
|---|---|---|---|---|
| $f_{min}$ | 55 | 2.81 | 197.49 | 41.89 |
| $f_0$ | 100 | 119.80 | 76.48 | 43.91 |
| $f_{max}$ | 210 | 224.45 | 15.24 | 4.50 |

If the prism P were removed, the air space $$(d_{10} + d_{11} + d_{12})$$

present between the last vertex of the front group and the first vertex of the rear group would have to be slightly reduced, as is well known, in order to compensate for the lowering of the refractive index in the space formerly by component V. Corresponding adjustments would have to be made if another prism, of different width and/or refractive index, were substituted for the one shown, it being thus apparent that this intergroup air space is insignificant insofar as the performance of the objective systems is concerned.

Another embodiment, represented by the values of the

TABLE I

| Lens | | Radii | Thicknesses and Separations | $n_d$ | $\nu$ | $\Delta n/r$ |
|---|---|---|---|---|---|---|
| I | $L_1$ | $r_1 = +297.18$ | $d_1 = 50.00$ | 1.61772 | 49.78 | +0.00207860 |
| | | $r_2 = -383.63$ | | | | -0.00037557 |
| | $L_2$ | | $d_2 = 12.50$ | 1.76180 | 26.98 | |
| | | $r_3 = -3440.63$ | | | | +0.00022141 |
| | | | $d_3 = 2.81$-$224.45$ | air space (variable) | | |
| | | $r_4 = -1312.50$ | | | | -0.00058042 |
| II | $L_3$ | | $d_4 = 21.88$ | 1.76180 | 26.98 | |
| | | $r_5 = -185.31$ | | | | +0.00074906 |
| | $L_4$ | | $d_5 = 6.25$ | 1.62299 | 58.12 | |
| | | $r_6 = +113.19$ | | | | -0.00550393 |
| | | | $d_6 = 197.49$-$13.24$ | air space (variable) | | |
| | | $r_7 = -146.62$ | | | | -0.00422889 |
| III | $L_5$ | | $d_7 = 6.25$ | 1.62004 | 36.34 | |
| | | $r_8 = -552.25$ | | | | +0.00112275 |
| | | | $d_8 = 41.89$-$4.50$ | air space (variable) | | |
| | | $r_9 = +290.56$ | | | | +0.00179016 |
| IV | $L_6$ | | $d_9 = 12.50$ | 1.52015 | 63.59 | |
| | | $r_{10} = -231.94$ | | | | +0.00224260 |
| | | | $d_{10} = 3.13$ | air space | | |
| | | $r_{11} = \infty$ | | | | |
| V | P | | $d_{11} = 56.25$ | 1.51680 | 64.20 | |
| | | $r_{12} = \infty$ | | | | |
| | | | $d_{12} = 18.94$ | air space | | |
| | | $r_{13} = +124.00$ | | | | +0.00546693 |
| | $L_7$ | | $d_{13} = 13.75$ | 1.67790 | 55.52 | |
| | | $r_{14} = -473.63$ | | | | +0.00143128 |
| | | | $d_{14} = 0.25$ | air space | | |
| | | $r_{15} = +56.31$ | | | | +0.01237435 |
| | $L_8$ | | $d_{15} = 14.87$ | 1.69680 | 55.61 | |
| VI | | $r_{16} = +85.50$ | | | | -0.00814970 |
| | | | $d_{16} = 7.50$ | air space | | |
| | | $r_{17} = -177.50$ | | | | -0.00442084 |
| | $L_9$ | | $d_{17} = 19.68$ | 1.78470 | 26.10 | |
| | | $r_{18} = +46.84$ | | | | -0.01675277 |
| | | | $d_{18} = 8.12$ | air space | | |
| | | $r_{19} = +93.00$ | | | | +0.00800000 |
| | $L_{10}$ | | $d_{19} = 14.38$ | 1.74400 | 44.90 | |
| | | $r_{20} = -71.94$ | | | | +0.01034195 |
| | | | $d_{total} = 508.44$ | | | | following Table II and illustrated in FIG. 2, has a back-focal length $s' = 72.27$ representing a considerably increased ratio $s'/d_{total}$, its overall focal length $f$ being variable from 57 to 215 units and its relative aperture being again 1:1.8.

TABLE II

| Lens | | Radii | Thicknesses and Separations | $n_d$ | $\nu$ | $\Delta n/r$ |
|---|---|---|---|---|---|---|
| I | L₁ | $r_1 = +264.17$ | $d_1 = 44.44$ | 1.61772 | 49.78 | +0.00233834 |
| | | $r_2 = -341.00$ | | | | -0.00042252 |
| | L₂ | | $d_2 = 11.11$ | 1.76180 | 26.98 | |
| | | $r_3 = -3055.55$ | | | | +0.00024932 |
| | | | $d_3 = 2.50$-$199.50$ | air space (variable) | | |
| II | L₃ | $r_4 = -1166.67$ | | | | -0.00065297 |
| | | | $d_4 = 19.44$ | 1.76180 | 26.98 | |
| | | $r_5 = -164.72$ | | | | +0.00084270 |
| | L₄ | | $d_5 = 5.55$ | 1.62299 | 58.12 | |
| | | $r_6 = +100.61$ | | | | -0.00619212 |
| | | | $d_6 = 175.56$-$11.78$ | air space (variable) | | |
| III | L₅ | $r_7 = -130.33$ | | | | -0.00475746 |
| | | | $d_7 = 5.55$ | 1.62004 | 36.34 | |
| | | $r_8 = -490.89$ | | | | +0.00126309 |
| | | | $d_8 = 37.22$-$4.00$ | air space (variable) | | |
| IV | L₆ | $r_9 = +258.28$ | | | | +0.00201389 |
| | | | $d_9 = 11.11$ | 1.52015 | 63.59 | |
| | | $r_{10} = -206.17$ | | | | +0.00252291 |
| | | | $d_{10} = 19.44$ | air space | | |
| V | P | $r_{11} = \infty$ | | | | |
| | | | $d_{11} = 50.00$ | 1.51680 | 64.20 | |
| | | $r_{12} = \infty$ | | | | |
| | | | $d_{12} = 24.44$ | air space | | |
| VI | L₇ | $r_{13} = +143.44$ | | | | +0.00487876 |
| | | | $d_{13} = 11.39$ | 1.69981 | 34.69 | |
| | | $r_{14} = -677.22$ | | | | +0.00103335 |
| | | | $d_{14} = 0.28$ | air space | | |
| | L₈ | $r_{15} = +57.94$ | | | | +0.01207076 |
| | | | $d_{15} = 12.22$ | 1.69938 | 49.74 | |
| | | $r_{16} = +97.11$ | | | | -0.00720193 |
| | | | $d_{16} = 6.94$ | air space | | |
| | L₉ | $r_{17} = -185.89$ | | | | -0.00433148 |
| | | | $d_{17} = 11.94$ | 1.80518 | 25.46 | |
| | | $r_{18} = +50.05$ | | | | -0.01608751 |
| | | | $d_{18} = 8.33$ | air space | | |
| | L₁₀ | $r_{19} = +95.89$ | | | | +0.00764938 |
| | | | $d_{19} = 29.44$ | 1.73350 | 51.04 | |
| | | $r_{20} = -71.33$ | | | | +0.01028319 |
| | | | $d_{total} = 486.90$ | | | |

The numerical values of both tables are to be understood as valid within tolerance limits of substantially ±10% for the thicknesses and separations $d_1$-$d_{19}$, the surface powers $\Delta n/r$ and the Abbé numbers $\nu$, and of substantially ±0.02 for the refractive indices $n_d$ (given for a reference wavelength of 587.6 microns).

The individual focal lengths in the system of Table II have the following numerical values:

$$f_I = +459.54$$
$$f_{II} = -165.44$$
$$f_{III} = -286.02$$
$$f_{IV} = +221.41$$
$$f_{VI} = +104.72$$

The magnitudes of the three variable air spaces in the principal positions of adjustment are as follows:

| $f$ | $d_3$ | $d_6$ | $d_8$ |
|---|---|---|---|
| $f_{min}$ = 57 | 2.50 | 175.56 | 37.22 |
| $f_0$ = 100 | 101.52 | 72.57 | 41.19 |
| $f_{max}$ = 215 | 199.50 | 11.78 | 4.00 |

Figure 3:
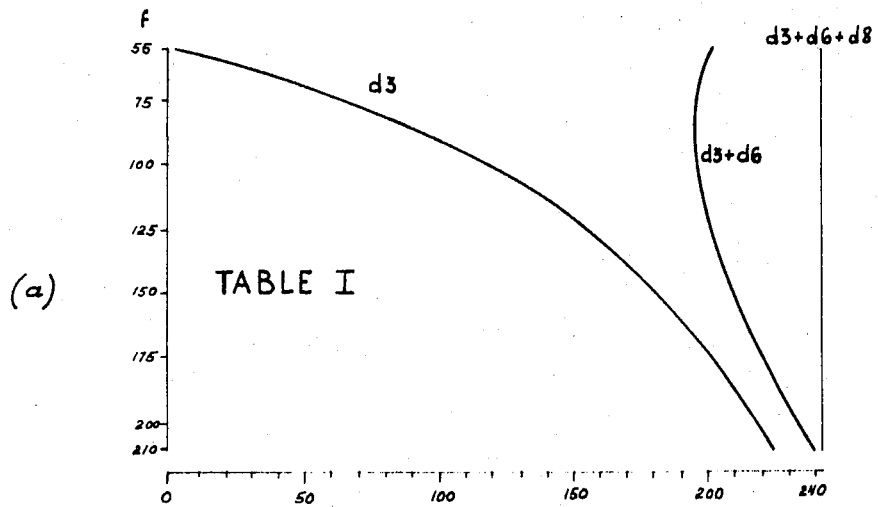
FIG. 3 is a pair of diagrams giving the law of motion of the movable components of the varifocal front group throughout the varifocal range for the system of FIG. 1 and FIG. 2 respectively.
Figure 3:
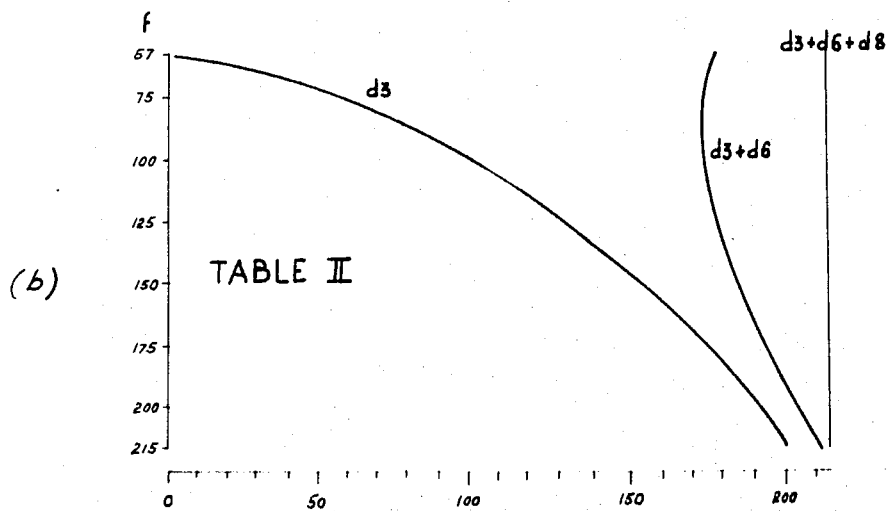

Upon a progressive change in the first air space $d_3$ by an axial displacement of component II, component III should undergo a compensatory displacement with consequent changes in air spaces $d_6$ and $d_8$ as shown graphically in FIG. 3. Each diagram (a) and (b) of this figure, respectively relating to the system of FIG. 1 (Table I) and to that of FIG. 2 (Table II), has a graph showing the variation of air space $d_3$ and another graph representing the sum of air spaces $d_3$, $d_6$ as a function of overall focal length $f$. Naturally, the sum of the three air spaces $d_3$, $d_6$ and $d_8$ must always remain constant, constituting as it does the separation of the fixed components I, IV diminished by the thicknesses of components II and III.

From the listed values of the individual focal lengths of the several components it will be noted that, in each of the two systems disclosed, the absolute value of the individual focal length of component II is less than that of any other component of the front group and less than twice that of the basic objective VI, being thus also less than the upper limiting value $f_{max} \approx 2f_0 \approx 2f_{IV}$ of the system.

Although the front component II has been referred to as fixed, it is to be noted that, for focusing purposes, this component may be limitedly axially displaceable in the well-known manner.

I claim:

1. An optical objective system comprising a variable front group and a fixed basic objective, the system having an overall focal length variable between a minimum value $f_{min}$ and a maximum value $f_{max}$ respectively smaller and larger than the individual focal length of said basic objective, said front group consisting of an at most limitedly adjustable positive first component on the object side of the system, an axially movable negative second component following said first component, an axially movable negative third component following said second component and a fixed positive fourth component following said third component and facing said basic objective, said first component being a doublet with a convex forward face and a negatively refracting forwardly concave cemented surface, said third component being a meniscus-shaped singlet with a convex rear surface, said fourth component being a biconvex singlet, said doublets being provided with nearly planar confronting surfaces, said rear surface of said third component having a positive refractive power greater than that of the cemented surface of said second component but less than that of each surface of said fourth component; the lenses L₁, L₂ of said first component, the lenses L₃, L₄ of said second component, said third component L₅ and said fourth component L₆ having radii $r_1$ to $r_{10}$ and thicknesses and separations $d_1$ to $d_9$ whose numerical values, based upon a numerical value of 100 for $f_0$, along with the refractive indices $n_d$ and the Abbé numbers $\nu$ thereof are substantially as given in the following table:

| Lens | Radii | Thicknesses and Separations | $n_d$ | $\nu$ |
|---|---|---|---|---|
| $L_1$ | $r_1=+297.18$ | $d_1=50.00$ | 1.61772 | 49.78 |
| $L_2$ | $r_2=-383.63$ | $d_2=12.50$ | 1.76180 | 26.98 |
|  | $r_3=-3440.63$ | $d_3=2.81$–$224.45$ | air space (variable) | |
| $L_3$ | $r_4=-1312.50$ | $d_4=21.88$ | 1.76180 | 26.98 |
|  | $r_5=-185.31$ | | | |
| $L_4$ | $r_6=+113.19$ | $d_5=6.25$ | 1.62299 | 58.12 |
|  | | $d_6=197.49$–$13.24$ | air space (variable) | |
|  | $r_7=-146.62$ | $d_7=6.25$ | 1.62004 | 36.34 |
| $L_5$ | $r_8=-552.25$ | | | |
|  | | $d_8=41.89$–$4.50$ | air space (variable) | |
|  | $r_9=+290.56$ | $d_9=12.50$ | 1.52015 | 63.59 |
| $L_6$ | $r_{10}=-231.94$ | | | |

2. A system as defined in claim 1 wherein said basic objective consists of four air-spaced lenses $L_7$, $L_8$, $L_9$, $L_{10}$ whose radii $r_{13}$ to $r_{20}$, thicknesses and separations $d_{13}$ to $d_{19}$, refractive indices $n_d$ and Abbé numbers $\nu$ are substantially as given in the following table:

| Lens | Radii | Thicknesses and Separations | $n_d$ | $\nu$ |
|---|---|---|---|---|
| $L_7$ | $r_{13}=+124.00$ | $d_{13}=13.75$ | 1.67790 | 55.52 |
|  | $r_{14}=-473.63$ | $d_{14}=0.25$ | air space | |
| $L_8$ | $r_{15}=+56.31$ | $d_{15}=14.87$ | 1.69680 | 55.61 |
|  | $r_{16}=+85.50$ | $d_{16}=7.50$ | air space | |
| $L_9$ | $r_{17}=-177.50$ | $d_{17}=19.68$ | 1.78470 | 26.10 |
|  | $r_{18}=+46.84$ | $d_{18}=8.12$ | air space | |
| $L_{10}$ | $r_{19}=+93.00$ | $d_{19}=14.38$ | 1.74400 | 44.90 |
|  | $r_{20}=-71.94$ | | | |

3. An optical objective system comprising a variable front group and a fixed basic objective, the system having an overall focal length variable between a minimum value $f_{\min}$ and a maximum value $f_{\max}$ respectively smaller and larger than the individual focal length of said basic objective, said front group consisting of an at most limitedly adjustable positive first component on the object side of the system, an axially movable negative second component following said first component, an axially movable negative third component following said second component and a fixed positive fourth component following said third component and facing said basic objective, said first component being a doublet with a convex forward face and a negatively refracting forwardly concave cemented surface, said third component being a meniscus-shaped singlet with a convex rear surface, said fourth component being a biconvex singlet, said doublets being provided with nearly planar confronting surfaces, said rear surface of said third component having a positive refractive power greater than that of the cemented surface of said second component but less than that of each surface of said fourth component; the lenses $L_1$, $L_2$ of said first component, the lenses $L_3$, $L_4$ of said second component, said third component $L_5$ and said fourth component $L_6$ having radii $r_1$ to $r_{10}$ and thicknesses and separations $d_1$ to $d_9$ whose numerical values, based upon a numerical value of 100 for $f_0$, along with the refractive indices $n_d$ and the Abbé numbers $\nu$ thereof are substantially as given in the following table:

| Lens | Radii | Thicknesses and Separations | $n_d$ | $\nu$ |
|---|---|---|---|---|
| $L_1$ | $r_1=+264.17$ | $d_1=44.44$ | 1.61772 | 49.78 |
| $L_2$ | $r_2=-341.00$ | $d_2=11.11$ | 1.76180 | 26.98 |
|  | $r_3=-3055.55$ | $d_3=2.50$–$199.50$ | air space (variable) | |
| $L_3$ | $r_4=-1166.67$ | $d_4=19.44$ | 1.76180 | 26.98 |
| $L_4$ | $r_5=-164.72$ | $d_5=5.55$ | 1.62299 | 58.12 |
|  | $r_6=+100.61$ | $d_6=175.56$–$11.78$ | air space (variable) | |
| $L_5$ | $r_7=-130.33$ | $d_7=5.55$ | 1.62004 | 36.34 |
|  | $r_8=-490.89$ | $d_8=37.22$–$4.00$ | air space (variable) | |
| $L_6$ | $r_9=+258.28$ | $d_9=11.11$ | 1.52015 | 63.59 |
|  | $r_{10}=-206.17$ | | | |

4. A system as defined in claim 3 wherein said basic objective consists of four air-spaced lenses $L_7$, $L_8$, $L_9$, $L_{10}$ whose radii $r_{13}$ to $r_{20}$, thicknesses and separations $d_{13}$ to $d_{19}$, refractive indices $n_d$ and Abbé numbers $\nu$ are substantially as given in the following table:

| Lens | Radii | Thicknesses and Separations | $n_d$ | $\nu$ |
|---|---|---|---|---|
| $L_7$ | $r_{13}=+143.44$ | $d_{13}=11.39$ | 1.69981 | 34.69 |
|  | $r_{14}=-677.22$ | $d_{14}=0.28$ | air space | |
| $L_8$ | $r_{15}=+57.94$ | $d_{15}=12.22$ | 1.69938 | 49.74 |
|  | $r_{16}=+97.11$ | $d_{16}=6.94$ | air space | |
| $L_9$ | $r_{17}=-185.89$ | $d_{17}=11.94$ | 1.80518 | 25.46 |
|  | $r_{18}=+50.05$ | $d_{18}=8.33$ | air space | |
| $L_{10}$ | $r_{19}=+95.89$ | $d_{19}=29.44$ | 1.73350 | 51.04 |
|  | $r_{20}=-71.33$ | | | |

References Cited

UNITED STATES PATENTS 3,273,457  9/1966  Macher et al.

OTHER REFERENCES

Macher, German application 1,185,393, printed Jan. 14, 1965.

JOHN K. CORBIN, Primary Examiner

U.S. Cl. X.R.

350—202, 214, 223